United States Patent
Van Brocklin et al.

(10) Patent No.: US 7,327,056 B2
(45) Date of Patent: Feb. 5, 2008

(54) MARKED HUB FOR SENSING MOTOR SPEED

(75) Inventors: Andrew L. Van Brocklin, Corvallis, OR (US); John M. Koegler, Corvallis, OR (US); John A. Devos, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 10/903,088

(22) Filed: Jul. 30, 2004

(65) Prior Publication Data

US 2006/0022532 A1 Feb. 2, 2006

(51) Int. Cl.
*H02K 7/00* (2006.01)

(52) U.S. Cl. .................................. 310/68 B; 310/89
(58) Field of Classification Search ............. 310/68 B, 310/156.01, 156.12–156.14, 156.26, 89
See application file for complete search history.

(56) References Cited

U.S. PATENT DOCUMENTS

| | | | |
|---|---|---|---|
| 4,024,446 A | 5/1977 | Burnett | |
| 4,214,249 A * | 7/1980 | Kasai et al. | 346/135.1 |
| 4,683,410 A | 7/1987 | Kressirer et al. | |
| 5,177,393 A * | 1/1993 | Webber | 310/68 B |
| 5,239,218 A * | 8/1993 | Hashimoto et al. | 310/68 B |
| 5,245,234 A * | 9/1993 | Okada et al. | 310/51 |
| 5,463,263 A * | 10/1995 | Flynn | 310/181 |
| 5,532,533 A * | 7/1996 | Mizutani | 310/68 B |
| 5,598,201 A | 1/1997 | Stodder et al. | |
| 6,111,384 A | 8/2000 | Stagnitto | |
| 6,737,781 B2 * | 5/2004 | Osada et al. | 310/156.28 |
| 2001/0033118 A1 * | 10/2001 | Osada et al. | 310/261 |
| 2003/0108708 A1 | 6/2003 | Anderson et al. | |

\* cited by examiner

*Primary Examiner*—Dang Le

(57) ABSTRACT

A motor hub is disclosed. The motor hub comprises a housing for a motor. The housing is rotatable around an axis of rotation of the motor. The motor hub also has marks arranged on a surface of the housing, and spaces between the marks. The marks and spaces form a pattern readable for sensing a rotational speed of the motor.

20 Claims, 6 Drawing Sheets

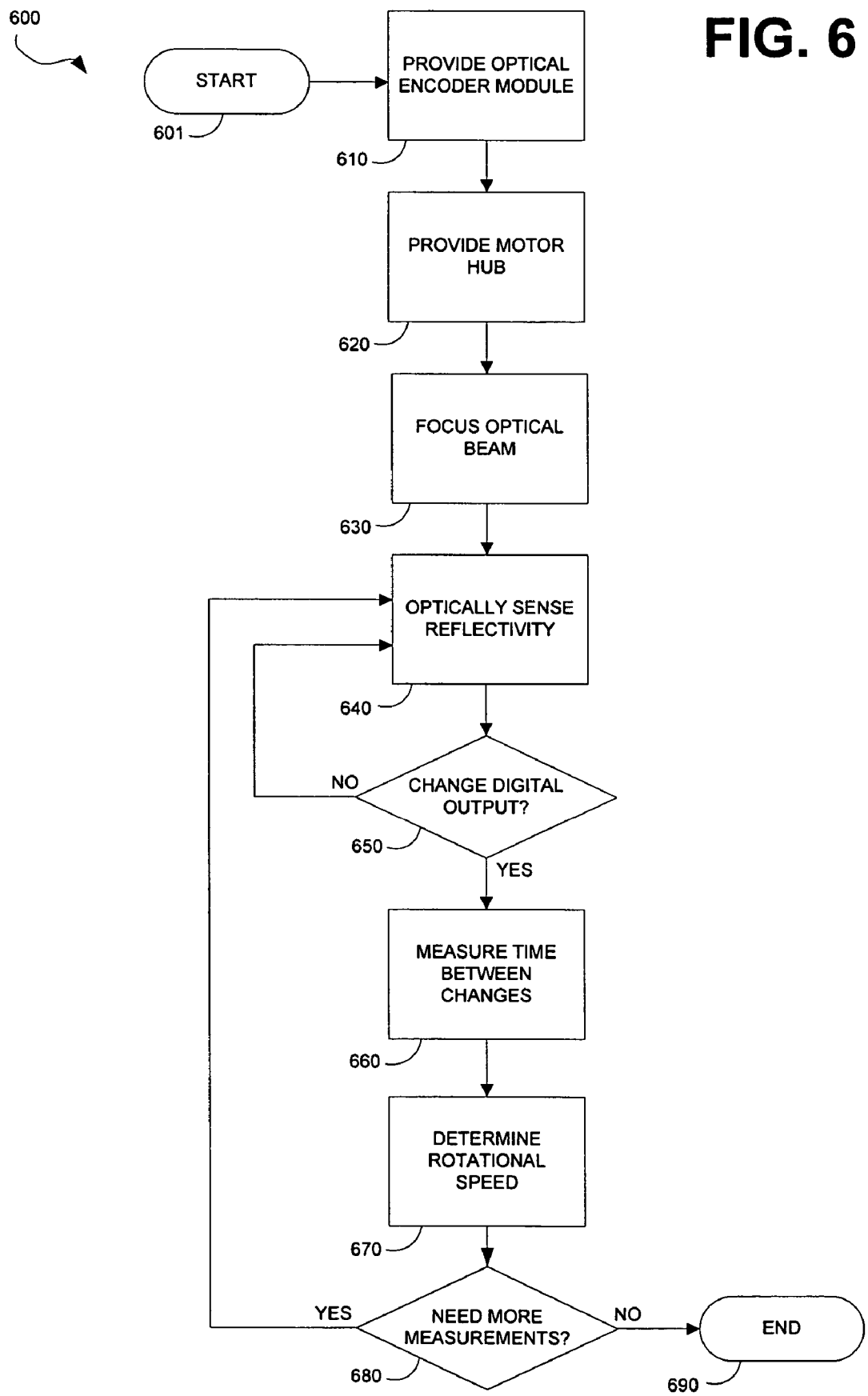

MARKED HUB FOR SENSING MOTOR SPEED

BACKGROUND

A motor is used to rotate media in conventional mass storage devices such as compact disc (CD) or digital versatile disc (DVD) drives, as well as magnetic hard disc drives and floppy disc drives. To obtain an acceptable degree of precision for assuring that data can be correctly written to or read from the media, it is desirable to obtain accurate information about the rotational speed of the motor during operation.

Methods for sensing the speed of a motor include the use of a codewheel coupled to the motor. Codewheels include discs typically constructed from metal, film, or glass, the discs having a pattern of slits or bars. A codewheel may be mounted on the shaft of the motor, perpendicular to the axis of rotation, such that the codewheel is rotated by the motor shaft. Codewheels may also be remotely coupled to the motor by one or more gears. For reading the codewheel, an encoder module can be mounted in a fixed position, relative to the rotating codewheel. The encoder module includes a sensor to optically sense the motion of markings on the codewheel as the motor shaft rotates. The module produces a digital output which may be used to determine the speed of the motor.

In another solution, used in some CD and DVD drives, a pattern is marked directly upon the media (e.g., by silk screening or embossing a pattern or codewheel onto each CD or DVD). As the motor rotates the CD or DVD, the encoder module senses the motion of the marks on the media, and produces a digital output which may be used to determine the speed of the motor.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 6 is a flow chart illustrating a method for determining a rotational speed of a motor according to an embodiment of the invention.

DETAILED DESCRIPTION

Figure 1A:
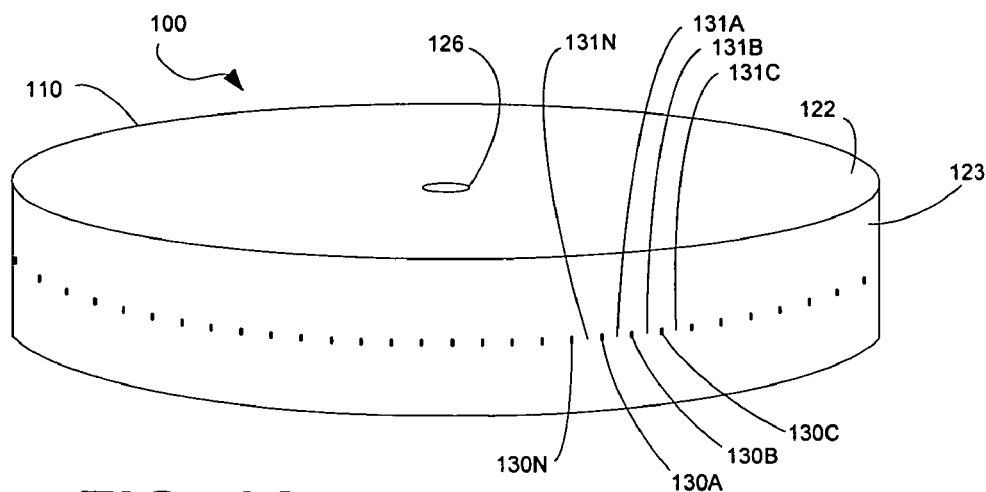
FIG. 1A is a perspective view of a housing for a motor hub according to an embodiment of the invention.

Referring to the drawings, in which like reference numerals indicate like elements, FIG. 1A illustrates a housing 110 for a motor hub 100 according to an embodiment of the invention. The housing 110 has an external surface comprising a top surface 122 and a side surface 123. Terms of orientation and relative position (such as "top," "bottom," "side," and the like) are not intended to require a particular orientation of the present invention or of any element or assembly of the present invention, and are used only for convenience of illustration and description. In some embodiments, the housing 110 may include a spindle hole 126, through which a shaft or spindle may be fixedly attached, such as by pressure fitting, gluing, or welding. The housing 110 has a hollow interior, not shown, and a bottom opening opposite the top surface 122. The motor hub 100 may further include one or more permanent magnets attached to the interior of the housing 110 for rotating the housing 110, such as in a manner known to those of ordinary skill in the art.

In an embodiment of the present invention, the housing 110 is marked with a repeating pattern comprising lines, marks, or spokes circularly arranged on a surface of the housing 110, as illustrated by exemplary marks 130A, 130B, 130C, ..., 130N, collectively referred to as the marks 130, shown on the side surface 123. Between each pair of neighboring marks 130 are unmarked portions of the external surface of the housing 110, as illustrated by exemplary spaces 131A, 131B, 131C, ..., 131N, collectively referred to as the spaces 131. In an alternative embodiment, the marks 130 and spaces 131 may be circularly arranged on the top surface 122.

The marks 130 may be spaced at substantially regular intervals on the surface of the housing 110. In an illustrative example, marks 130 and spaces 131 may be substantially equal in width. However, a mark 130 may be of various shapes or widths, including, for example, linear, rectangular, circular, and elliptical shapes. A mark 130 may have a depth, or may be substantially flat. The spacing, shape, width, depth, and number of marks 130 may be selected such that a rotational speed of the motor hub 100 may be determined at least to a desired degree of precision. Such selections may take into account the operating requirements of an optical encoder module 180, shown below in FIG. 1B. In some embodiments, the spacing, shape, width, and depth of the marks 130 are substantially consistent, subject to minor imprecisions and fluctuations within the tolerance of the optical encoder module 180. In other embodiments, irregular patterns and non-uniform marks may also be used; for example, by making one or more of the marks 130 or spaces 131 wider than others, a position may be sensed as well as a speed. The pattern formed by the marks 130 and spaces 131 is readable by the optical encoder module 180 for at least sensing a rotational speed of the housing 110. Sensing the rotational speed may include acquiring data used for determining a rotational velocity, acceleration, relative position, and/or absolute position of the housing 110.

The marks 130 have a reflectivity that differs from the reflectivity of the spaces 131. For example, the external surface of the housing 110 may be metal or another substance having a relatively high reflectivity, and the marks 130 may have a low reflectivity, such as by darkening with laser-marking, ink, or pigment. The external surface may in some embodiments have a high-reflectivity coating between the marks 130. In one embodiment, a laser may be used for writing the marks 130 onto the housing 110. In alternative embodiments, the marks 130 may also be marked through other methods such as printing, etching, tape, and the like. The housing 110 may also be marked by integrally molding the marks 130 into the surface of the housing 110.

In an illustrative example, a housing 110 for a spindle motor used in a CD/DVD drive may be laser-marked with four hundred marks 130 substantially equally spaced around a circumference of the housing 110, leaving four hundred spaces 131 between the marks. The angular distance between marks 130 in this example is 0.9 degrees. For an exemplary spindle motor with a housing 110 having a diameter of about 43 millimeters, the marks 130 are placed about 338 micrometers from the center of a mark 130 to the center of an adjacent mark 130, measured along the circumference of the housing 110. Where material from the housing 110 is vaporized by laser-marking, the exemplary mark 130 has a depth, the depth of the vaporized portion being greater toward the center of the mark 130, and becoming shallower approaching an edge of the vaporized portion. The width from a first edge to a second edge of the vaporized portion of an exemplary mark 130, passing through the center, is about 88 micrometers, measured along the circumference of the housing 110. A heat-affected zone of the housing 110 extends outward from the first and second edges about 32.5 micrometers, in a direction opposite the center of the exemplary mark 130. The exemplary mark 130 comprises the area between the first edge and the second edge of the vaporized portion, and further comprises the heat-affected zone extending outward from the edges. An exemplary space 131 is about 185 micrometers in width, from an outer edge of the heat-affected zone of a first mark 130 to an outer edge of the heat-affected zone of an adjacent mark 130, measured along the circumference of the housing 110.

Figure 1B:
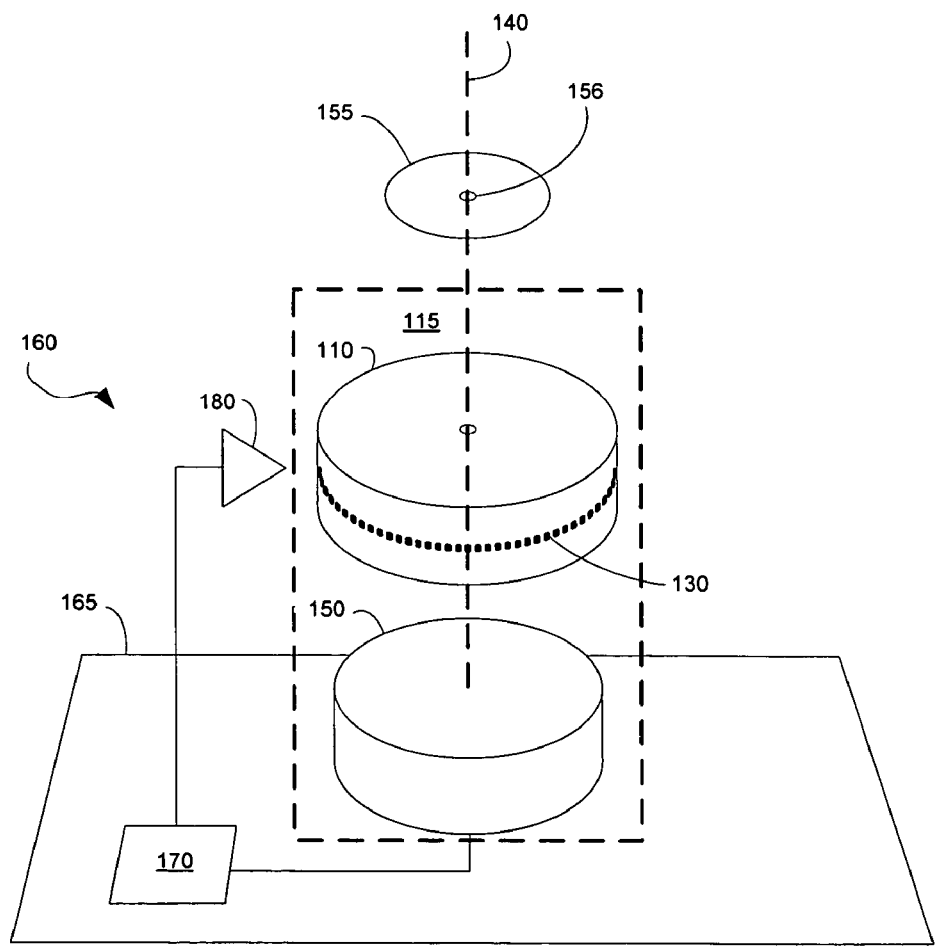
FIG. 1B is an exploded plan view of a device according to an embodiment of the invention.

FIG. 1B is an exploded plan view of a device 160 according to an embodiment of the invention. A motor 115 comprises a stator 150 and the motor hub 100, including housing 110. In one embodiment, the motor 115 is a spindle motor. The motor hub 100 is able to receive at least a portion of the stator 150 in the bottom opening, not shown, of the housing 110. The motor hub 110 fits loosely over the stator 150 and rests on the stator 150. Points of contact between the motor hub 100 and the stator 150 may be lubricated or unlubricated. In some embodiments, one or both of the stator 150 and the motor hub 100 may comprise ball bearings for reducing friction at the points of contact for the rotation of the housing 110 and shaft, if any. Ball bearings, if used, may allow for more precise spin, quieter operation, and longer life of the motor 115.

The stator 150 remains stationary, while the motor hub 100 rotates around an axis of rotation 140 of the motor 115. The stator 150 may be mounted on a printed circuit board 165. The stator 150 is shown in simplified form, and need not be cylindrical in shape. In an illustrative example, the stator 150 may comprise a hub having a plurality of spokes bearing coils or windings. For instance, the stator 150 may comprise coils or windings of wire conducting an electrical current, for causing one or more permanent magnets mounted around the interior of motor hub 100 to rotate the housing 110 around the axis of rotation 140.

In one embodiment, the motor hub 100 is attached to a platen 155 for gripping and applying torque to an object, such as optical or magnetic media, to be rotated by the motor 115. The platen 155 may in some embodiments comprise a second spindle hole 156 through which a shaft or spindle may, for example, be fixedly attached or rotatably inserted.

The device 160 includes a controller 170 for at least controlling the motor 115. Additional functions that may be performed by controller 170 are discussed below. The controller 170 is communicatively coupled to an optical encoder module 180.

The optical encoder module 180 is mounted in a fixed position where it is able to optically sense a rotating portion of the housing 110 containing the marks 130. For example, the optical encoder module 180 may be fastened to printed circuit board 165. As the marks 130 and spaces 131 rotate around the axis of rotation 140, the optical encoder module 180 produces a digital output which may be communicated to the controller 170, and which may be used to determine the rotational speed of the motor 115. The digital output may change responsively to a transition between a mark 130 and a space 131. In some embodiments, the marks 131 are uniformly spaced, such that a change in the length of time between changes of the digital output is directly proportional to a change in the rotational speed of the motor. For example, the optical encoder module 180 may include a light source, such as a light-emitting diode; a lens for focusing light onto the housing 110 at a position of marks 130 and spaces 131; and a sensor, such as a photodetector integrated circuit comprising photodiodes, for receiving light reflected back from housing 110. The optical encoder module 180 may use visible light or invisible radiation, such as infrared. Illustrative examples of an optical encoder module 180 include surface-mount reflective encoders such as those available from Agilent Technologies, Inc.

Figure 2:
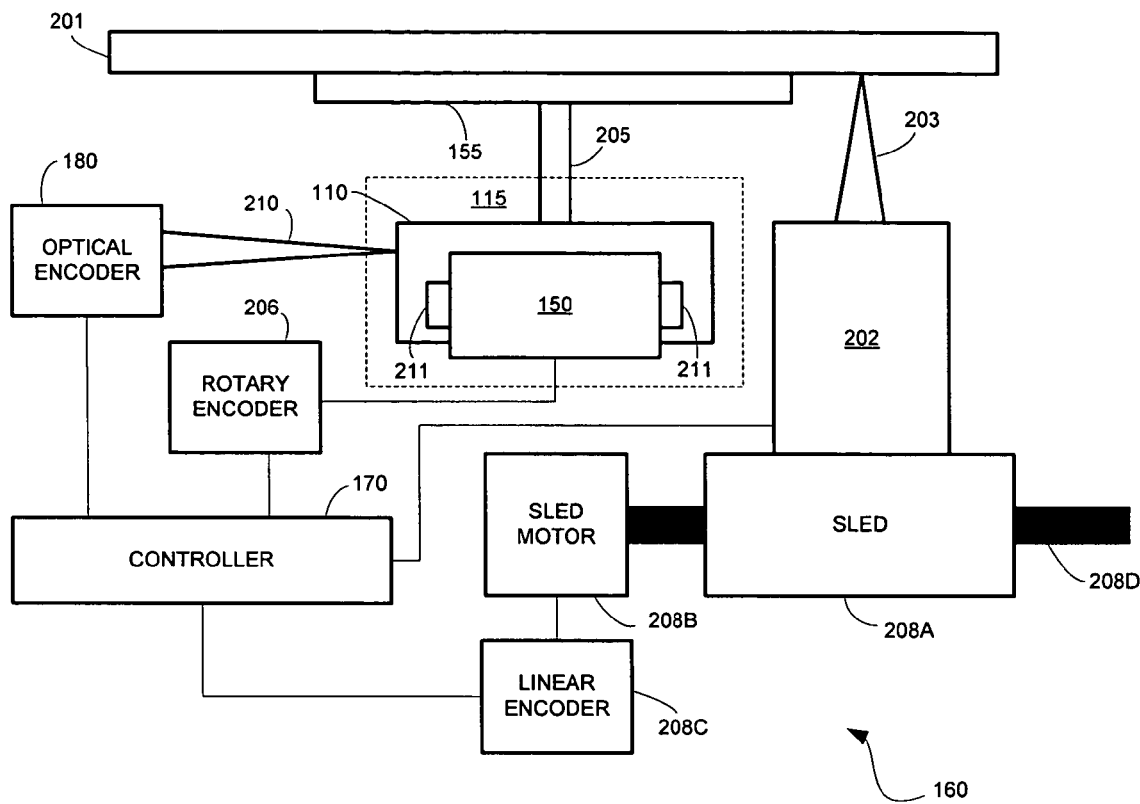
FIG. 2 is a diagram of a mass storage device according to an alternative embodiment of the invention.

FIG. 2 shows a diagram of a mass storage device 160 according to an alternate embodiment of the invention. The device 160 is for reading data from a medium 201, and may also be able to write data to the medium 201. The device 160 may, for example, be part of a CD or DVD drive or a magnetic disc drive, which in turn is connectable to a computer via a I/O channel.

More particularly, in an illustrative embodiment, the device 160 is a mass storage device for reading from and/or writing to an optical disc medium 201. The device 160 includes a read/write mechanism 202. The read/write mechanism 202 comprises a beam source for generating the optical beam 203, an objective lens for focusing the optical beam 203 onto a surface of the medium 201, and a photodetector for sensing the optical beam 203 reflected back from the surface of the medium 201.

A spindle 205 is shown coupling platen 155 to housing 110. The spindle 205 may pass through spindle holes 126, 156. The medium 201 may be situated on platen 155, and may be gripped by platen 155. The platen 155 rotates the medium 201 to a given position specified by a rotary encoder 206 communicatively coupled to the motor 115. The rotary encoder 206 may be separate from the optical encoder module 180, or may comprise the optical encoder module 180.

The motor 115 includes at least one permanent magnet 211, which may be mounted in the interior of housing 110. As shown in cross-section in the illustration, a permanent magnet 211 may, for example, take the form of a magnetic ring attached to the housing 110, for rotating the housing 110 relative to the stator 150.

The device 160 further includes a sled 208A, a sled motor 208B, a linear encoder 208C, and a rail 208D, which are collectively referred to as the sled motor mechanism 208. The sled motor mechanism 208 moves the read/write mechanism 202 radially relative to the medium 201. In particular, the read/write mechanism 202 is situated on the sled 208A, which is moved on the rail 208D by the sled motor 208B to a given position specified by the linear encoder 208C communicatively coupled to the sled motor 208B. The linear encoder 208C and the rotary encoder 206 may include hardware, software, or a combination of hardware and software.

The device 160 also includes the optical encoder module 180, which emits and focuses an optical beam 210 onto the housing 110 at a position of marks 130 and spaces 131, and which receives the optical beam 210 reflected back from housing 110. The optical encoder module 180 optically senses the motion of the marks 130 and produces a digital output, such as to controller 170, which may be used to determine the rotational speed of the motor 115. In the illustrated embodiment, there is no need for a pattern or codewheel to be marked upon the medium 201 that the motor 115 is rotating, and there is also no need for a separate codewheel to be mounted on the motor 115 or spindle 205.

The mass storage device, in an illustrative example, may also be used for writing a label to an optically writable label side of an optical disc medium 201. An example of an optically writable label side is particularly disclosed in the patent application of Anderson et al. entitled "Integrated CD/DVD Recording and Labeling," filed Oct. 11, 2001, and published on Jun. 12, 2003 as U.S. Pub. No. 2003/0108708 A1. When the read/write mechanism 202 and its optical beam 203 are used for writing to an optically writable label side rather than a data side of an optical disc medium 201, certain feedback information, such as speed information, that might otherwise be read from the disc 201 may not be available. Accordingly, writing a label side presents a special challenge for motor speed control in the exemplary mass storage device, presenting a need for the additional optical beam 210 emitted by the optical encoder module 180. In such a mass storage device, the optical encoder module 180 and optical beam 210 may not necessarily be needed during reading or writing to the data side of the optical disc medium 201, because the feedback information may be available from the data side of the disc 201.

The controller 170 receives information from the optical encoder module 180, and controls the motor 115 and the sled motor mechanism 208. The device 160 may comprise firmware or other computer-readable media for storing instructions to the controller 170. The components depicted in the device 160 are representative of an illustrative embodiment of the invention, and do not limit all embodiments of the invention.

Figure 3:
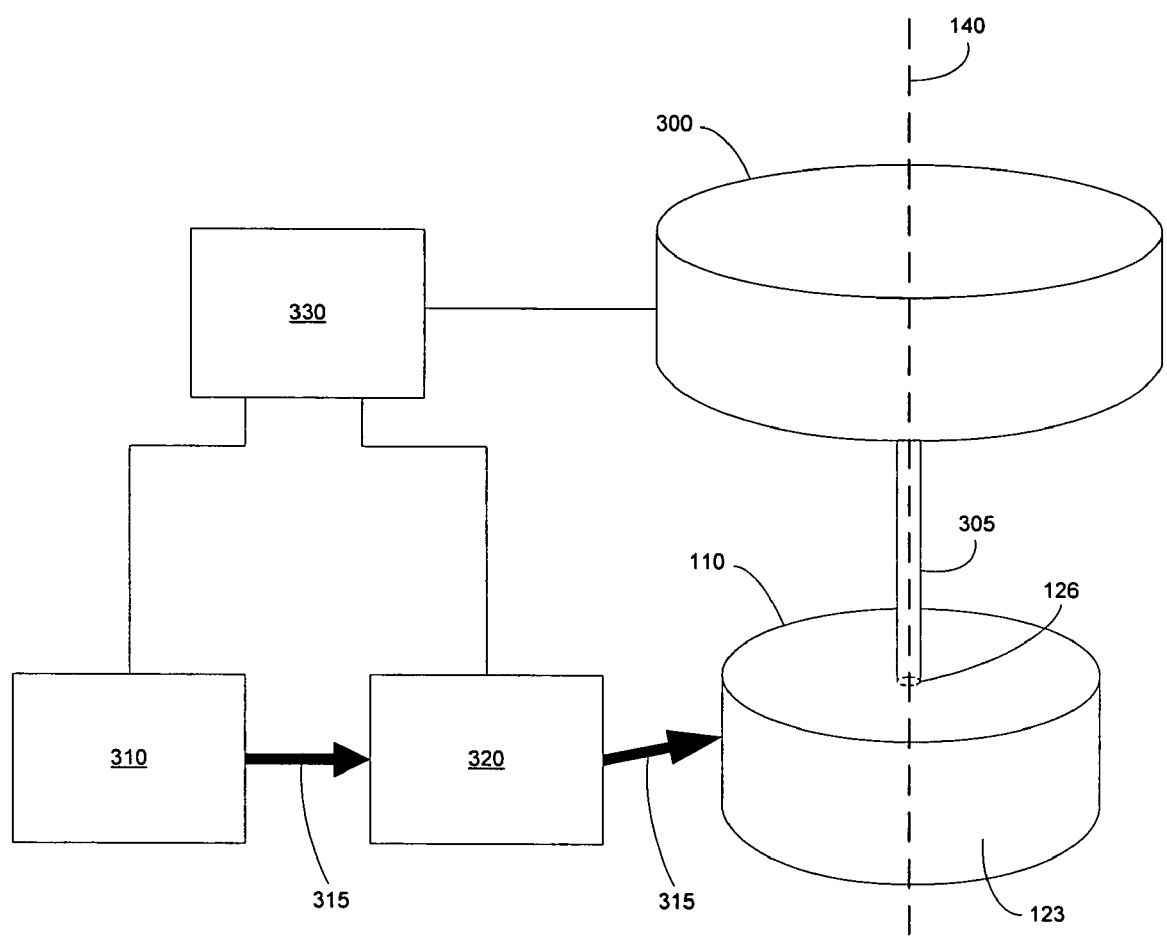
FIG. 3 is a diagram of a system for marking a motor housing according to an embodiment of the invention.

FIG. 3 depicts a system for marking a housing 110 according to an embodiment of the invention. A second motor 300 is removably coupled to the housing 110. The second motor 300 may, for example, be a stepping motor or a servo motor. In an illustrative example, the housing 110 may be coupled to the second motor 300 by a second spindle 305, which may be removably fastened to the housing 110 through spindle hole 126.

A laser generator 310 generates an optical beam 315 for marking an external surface of the housing 110, such as side surface 123. The laser generator 310 is optically coupled to a beam steerer 320, such that the optical beam 315 passes through the beam steerer 320, and may be deflected or steered by the beam steerer 320. The beam steerer 320 may comprise a modulator. The beam steerer 320 and the laser generator 310 may be communicatively coupled to a marking controller 330. In an illustrative example, the beam steerer 320 is able to steer the beam 315 according to X-Y positioning data. The X-Y positioning data may be received from the marking controller 330 or stored in the beam steerer 320.

The second motor 300 may also be communicatively coupled to the marking controller 330, for regulating the rotation of the second motor 300. The second motor 300 rotates the housing 110 around an axis of rotation 140, such that a rotating portion of an external surface of the housing 110 is presented to the optical beam 315. The optical beam 315 writes the marks 130 onto the housing 110 using a constant angle; for example, the beam steerer 320 may position the optical beam 315 so as to strike the housing 110 at the same angle at which optical beam 210, emitted by the optical encoder module 180, is expected to strike the housing 110. In this way, variations in the diameter of the housing 110, which may affect the absolute spacing of the marks 130, will have no measurable effect on the spacing of the marks 130 and spaces 131 when viewed from the direction of the optical encoder module 180.

The second motor 300 need not be similar in construction to motor 115. In an illustrative example, the second motor 300 may be a linear stepping motor, but any type of servo motor or stepping motor may be used. The second motor 300 has a resolution or accuracy at least sufficient to assure that the marks 130 are placed upon the housing 110 with a positional accuracy such that a rotational speed of the housing 100 may be determined, at least to a desired degree of precision, using an optical encoder 180. In an embodiment of the invention, the optical encoder 180 has a requirement for spacing of the pattern formed by the marks 130 and spaces 131, and the second motor 300 has a positional accuracy at least able to meet the requirement of the optical encoder 180.

A positional accuracy within 0.1 degrees of rotation may be sufficiently precise for some applications. Averaging may be used to help compensate for a relatively low positional accuracy in the placement of marks 130. However, a positional accuracy within 0.01 degrees of rotation may be desired, particularly for determining relatively low rotational speeds of the housing 110 with a desired degree of precision during the operation of motor 115. Where the housing 110 is intended for use in a motor 115 for applications requiring extremely high resolution, such as very high resolution printing, a correspondingly high positional accuracy may be desired, such as accuracy within 0.0001 degrees.

The invention is not limited to marking the marks 130 circumferentially, such as on the side surface 123 of the housing 110. Marks 130 also may be marked radially, such as on the top surface 122 of the housing 110. The marks 130 may be marked at any angle relative to the axis of rotation 140. For example, in alternative embodiments, the marks 130 may be marked perpendicularly to the axis of rotation 140, e.g., on the top surface 122 or a bottom surface of the housing 110.

Figure 4A:
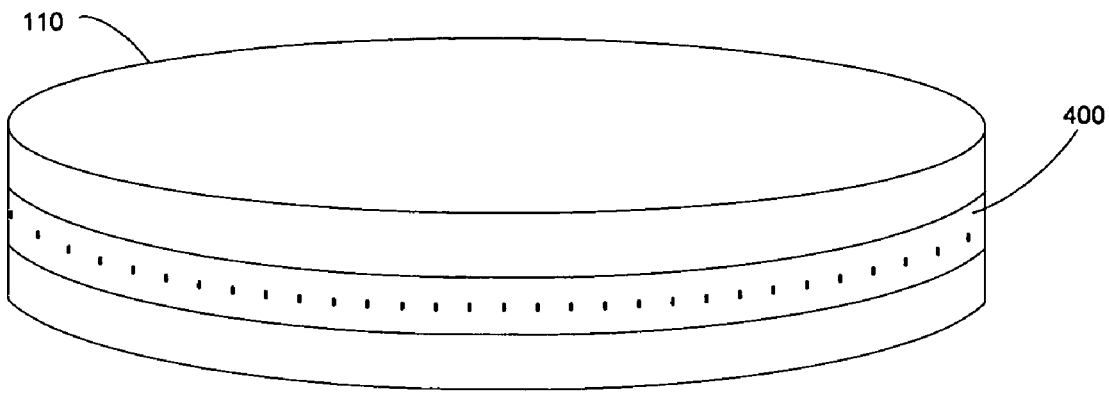
FIG. 4A is a perspective view of a housing for a motor hub according to an alternative embodiment of the invention.

FIG. 4A is a perspective view of a housing 110 for a motor hub 100 according to an alternative embodiment of the invention. The external surface of the housing 110 comprises a ring 400 attached to the housing 110, where a space 131 comprising an unmarked portion of the ring 400 has a reflectivity that differs from that of a mark 130. The marks 130 may be circularly arranged on such a ring 400. As illustrated, the ring 400 encloses a circumference of the housing 110. The ring 400 may be constructed of any material able to receive the marks 130, such as metal, paper, vinyl, or plastic. The ring 400 may be formed by any process, including molding, bending, cutting to shape, or the like. The ring 400 may be marked by any process, including, for example, by laser-writing, printing, etching, tape, integrally molding the marks 130 into the surface of the ring 400, and the like. In some embodiments, the ring 400 may comprise a diffraction grating for diffracting light from the spaces 131, thereby providing a desired contrast between the reflectivity of marks 130 and the reflectivity of spaces 131. The ring 400 may be attached to the housing 110 by adhesive, welding, screws, fasteners, or the like. The ring 400 may also be slipped over the housing 110 and attached by pressure fitting.

Figure 4B:
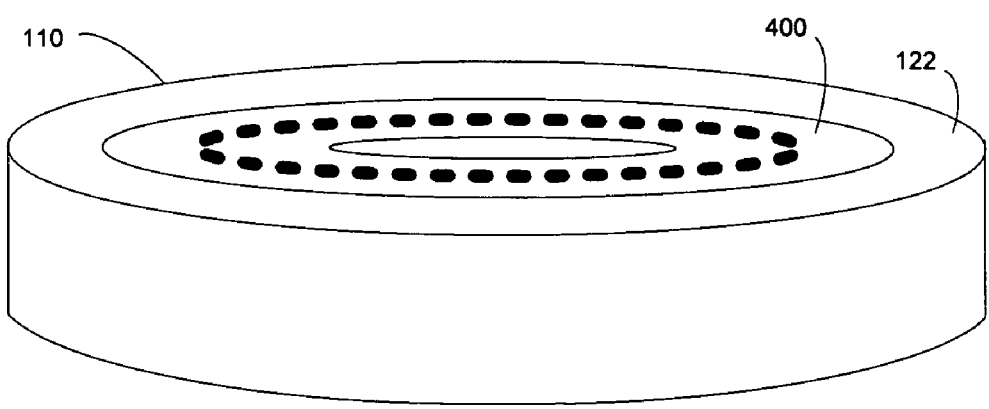
FIG. 4B is a perspective view of a housing for a motor hub according to another alternative embodiment of the invention.

FIG. 4B is a perspective view of a housing 110 for a motor hub 100 according to another alternative embodiment of the invention. The ring 400 is attached to the top surface 122 of the housing 110. Marks 130 are circularly arranged on the ring 400 in a plane perpendicular to the axis of rotation 140. In another illustrative example, the marks 130 may be elongated, radiating outward along radii from the axis of rotation 140. In still another embodiment, the marks 130 may be arranged directly on the top surface 122 of the housing 110.

Figure 5:
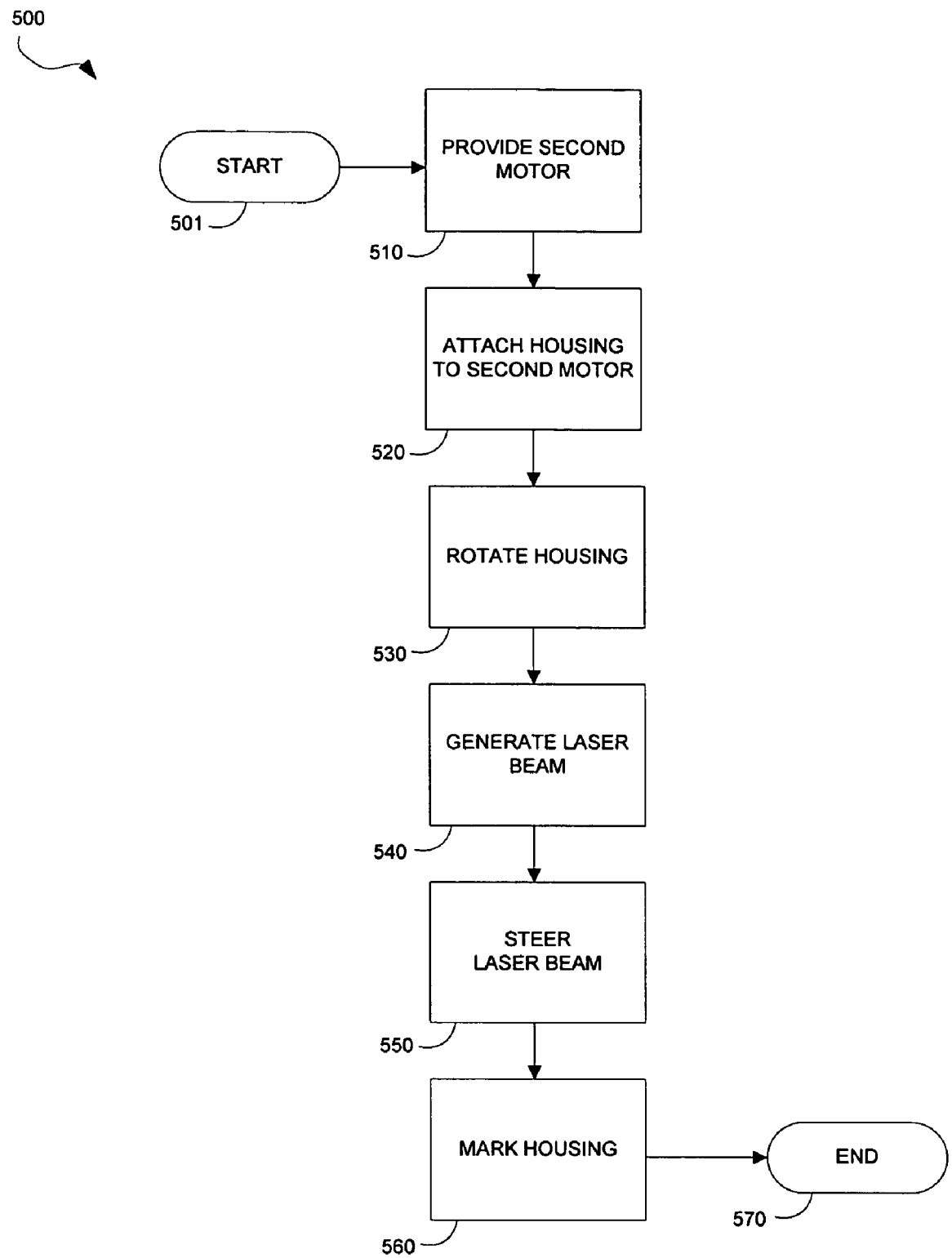
FIG. 5 is a flow chart illustrating a method for producing a motor hub according to an embodiment of the invention.

FIG. 5 shows a method 500 for producing a motor hub 100 according to an embodiment of the invention. The method begins at start block 501, and proceeds to block 510. At block 510, a second motor 300 is provided.

At block 520, a housing 110 of the motor hub 100 is removably attached to a rotatable portion of the second motor 300. Next, at block 530, the second motor 300 may be turned on, and the housing 110 is rotated by the rotatable portion of the second motor 300. In one embodiment, the rotatable portion of the second motor 300 rotates with a positional accuracy at least able to meet any requirements or specifications of the optical encoder 180 as to the spacing of the pattern of marks 130 and spaces 131 to be marked on the housing 110.

At block 540, an optical beam 315 is generated by laser generator 310. At block 550, the optical beam 315 is steered by beam steerer 320 to a rotating portion of an external surface of the housing 110. The rotating portion of the surface may be the side surface 123, which rotates circumferentially around the axis of rotation 140, or the top surface 122, which rotates in a plane perpendicular to the axis of rotation 140.

At block 560, the optical beam 315 marks the rotating portion of the housing 110. In an embodiment of the invention, marking the rotating portion of the housing 110 comprises lasering a plurality of marks 130 in a circular arrangement on the rotating portion of the housing 110, and leaving a plurality of spaces 131 between the marks 130. The method 500 concludes at end block 570.

In an embodiment of the invention, a marking controller 330 may control the laser generator 310 and/or the beam steerer 320 for performing steering at block 550 or marking at block 560, according to the method 500. The marking controller 330 may also control the second motor 300 for performing rotating at block 530. For instance, the marking controller 330 may be a computer, or may comprise a computer-readable storage medium, such as firmware, containing a set of software instructions to the marking controller 330, or the marking controller 330 may be networked or connected, including physically or wirelessly connected, to a computer adapted to run software for performing steering 550 or marking 560.

FIG. 6 shows a method 600 for determining a rotational speed of a motor 115 according to an embodiment of the invention. The method begins at start block 601, and proceeds to block 610. At block 610, an optical encoder module 180 is provided.

At block 620, a motor hub 100 for the motor 115 is provided. The motor hub 100 comprises a plurality of marks 130 and a plurality of spaces 131 arranged on an external surface of the motor hub 100; for instance, on a side surface 123 or a top surface 122 of a housing 110.

At block 630, an optical beam 210 is focused onto a rotating portion of an external surface of the motor hub 100. At block 640, a reflectivity for the rotating portion is optically sensed; for example, by receiving a reflected portion of the optical beam 210 at a photodetector of the optical encoder module 180.

At block 650, a check is made whether to change the value of a digital output of the optical encoder module 180; for example, by determining whether the reflectivity sensed at block 640 indicates a mark 130 or a space 131, and changing an existing value of the digital output if a transition between a mark 130 and a space 131 has occurred. If the check at block 650 indicates that no change is needed, the method returns to block 640. Otherwise, at block 660, a length of time is measured between changes in the value of the digital output.

At block 670, the rotational speed of the motor 115 may be determined, such as in a manner known to those of ordinary skill in the art. For example, given a known arrangement of the marks 130 and the spaces 131, the rotational speed may be readily determined using the length of time between changes to the value of the digital output. In some embodiments, a relative and/or absolute position of the motor 115 may be determined. In further embodiments, the length of time may be averaged with one or more previously measured lengths of time. In determining the rotational speed, it may be sufficient to determine whether the rotational speed is higher or lower than a desired speed. In some embodiments, an absolute measurement of angular or linear velocity or acceleration may be obtained.

In an illustrative example, the determination obtained at block 670 may be responsive to a request for a speed determination made by controller 170, or to a request made to controller 170 by a computer or processor communicatively coupled to controller 170. The determination obtained at block 670 may, for example, be used by the controller 170 to regulate or adjust the speed of the motor 115.

A check is performed at block 680 to determine whether any more measurements are needed. If the check at block 680 indicates that no further measurements are needed, the method proceeds to block 690; otherwise, the method returns to block 640. The method concludes at end block 690.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A motor hub comprising:
   a housing for a motor, the housing being rotatable around an axis of rotation of the motor
   a plurality of marks arranged on an external surface of the housing, and
   a plurality of spaces between the marks, the marks and spaces forming a pattern readable for sensing a rotational speed of the motor,
   wherein the marks are discrete and have a reflectivity lower than a reflectivity of the spaces on the external surface of the housing between the marks, and
   wherein the pattern is readable, for sensing the rotational speed of the motor, due to the marks having the reflectivity lower than the reflectivity of the spaces.

2. The motor hub of claim 1 wherein the pattern is readable by an optical encoder.

3. The motor hub of claim 1 wherein the marks are circularly arranged.

4. The motor hub of claim 1, wherein the surface comprises a ring attached to the housing, the marks being arranged on the ring.

5. The motor hub of claim 4, the ring being molded for fitting to the housing.

6. The motor hub of claim 1, wherein the marks are laser-written on the surface.

7. The motor hub of claim 1, wherein the surface comprises a diffraction grating for diffracting light from the spaces.

8. The motor hub of claim 1 wherein the marks are parallel to the axis of rotation.

9. The motor hub of claim 1 wherein the marks are perpendicular to the axis of rotation.

10. The motor hub of claim 1 wherein the marks radiate outward from the axis of rotation.

11. The motor hub of claim 1 wherein the motor is a spindle motor.

12. The motor hub of claim 1, further comprising one or more permanent magnets for rotating the housing around a stator of the motor.

13. The motor hub of claim 1 wherein the housing is attached to a platen for rotating a medium in a mass storage device.

14. The motor hub of claim 13 wherein the mass storage device is an optical disc drive.

15. The motor hub of claim 1, wherein the external surface is a cylindrical surface.

16. The motor hub of claim 1, wherein the external surface is a planar surface.

17. A mass storage device comprising:

a motor comprising a housing rotatable around an axis of rotation of the motor, a plurality of marks arranged on an external surface of the housing, a plurality of spaces between the marks, and an optical encoder module fixedly attached to a stationary portion of the motor, for sensing the rotation of the marks and the spaces, wherein the marks are discrete and have a reflectivity lower than a reflectivity of the spaces on the external surface of the housing between the marks, and wherein the optical encoder senses the rotation of the marks and the spaces due to the marks having the reflectivity lower than the reflectivity of the spaces.

18. The mass storage device of claim 17 further comprising an optical beam emitted from the optical encoder module, the beam being focused upon a rotating portion of the housing, and reflected back to the optical encoder module.

19. The mass storage device of claim 17 wherein the surface comprises a ring attached to the housing, the marks being arranged on the ring.

20. The mass storage device of claim 17 wherein the marks have a first reflectivity, and the spaces have a second reflectivity, such that the optical encoder module is able to distinguish the first reflectivity from the second reflectivity.

* * * * *